US006530330B2

United States Patent
Sepe et al.

(10) Patent No.: US 6,530,330 B2
(45) Date of Patent: Mar. 11, 2003

(54) LIGHTWEIGHT AIRCRAFT TABLE TOP

(75) Inventors: Kelly Sepe, Eureka, MO (US); Tom Tebbenhoff, Freeburg, IL (US); Don Kamp, St. Genevieve, MO (US)

(73) Assignee: Midcoast Aviation, Inc., Cahokia, IL (US)

( * ) Notice: Subject to any disclaimer, the term of this patent is extended or adjusted under 35 U.S.C. 154(b) by 0 days.

(21) Appl. No.: 09/897,512

(22) Filed: Jun. 29, 2001

(65) Prior Publication Data

US 2003/0000430 A1 Jan. 2, 2003

(51) Int. Cl.$^7$ .................................................. A47B 23/00
(52) U.S. Cl. ....................................... 108/44; 244/118.5
(58) Field of Search ............................. 108/165, 47, 42, 108/157.14, 51.3; 244/118.5, 118.6

(56) References Cited

U.S. PATENT DOCUMENTS

| 2,640,597 A | * | 6/1953 | Thomson |
| 3,866,550 A | * | 2/1975 | Geschewnder |
| 4,463,044 A | | 7/1984 | McKinney |
| 4,859,517 A | | 8/1989 | Hull |
| 5,205,221 A | * | 4/1993 | Melin et al. |
| 5,212,003 A | * | 5/1993 | Homer |
| 5,605,102 A | * | 2/1997 | Simpson |
| 5,667,866 A | * | 9/1997 | Reese, Jr. |
| 5,683,781 A | * | 11/1997 | Komarek et al. |
| 5,722,586 A | * | 3/1998 | Hansen |
| 5,836,547 A | * | 11/1998 | Koc et al. |
| 5,897,739 A | | 4/1999 | Forster et al. |
| 5,947,037 A | * | 9/1999 | Hornberger et al. |
| 5,947,416 A | | 9/1999 | Kraft |
| 6,179,086 B1 | * | 1/2001 | Bansemir et al. |
| 6,227,515 B1 | * | 5/2001 | Broyles |

FOREIGN PATENT DOCUMENTS

JP          10-238254       *   9/1998

* cited by examiner

*Primary Examiner*—Jose V. Chen
(74) *Attorney, Agent, or Firm*—Thompson Coburn LLP; Alan H. Norman

(57) ABSTRACT

A lightweight aircraft table top member comprising a honeycomb core, an upper skin and a lower skin. The honeycomb core has a top surface and a bottom surface. The honeycomb core further has a cellular structure with each of a plurality of cells thereof having a top edge and a bottom edge. The edges of the cells define the core's top and bottom surfaces. The honeycomb core including first cells adjacent a first end of the core, second cells adjacent a second end of the core and midway cells midway between the first and second cells. The first cells, second cells and midway cells extend from the lower skin to the upper skin. The honeycomb core tapers in thickness from its first end to its second end such that the length of each of the midway cells is less than the length of each of the first cells and such that the length of each of the second cells is less than the length of each of the midway cells.

25 Claims, 3 Drawing Sheets

LIGHTWEIGHT AIRCRAFT TABLE TOP

BACKGROUND OF THE INVENTION

This invention relates generally to aircraft table tops, and more particularly to lightweight aircraft table tops of composite materials.

Cabins of corporate aircraft, such as corporate jets, often have passenger chairs and pull-out tables adjacent the chairs. A typical pull-out table comprises a table top mounted via a support mechanism to a side wall of the cabin. The support mechanism enables the table top to be moved between a stowed position and a deployed position. The table top, when in its stowed position, is hid within a compartment in the side wall of the cabin. The table top, when in its deployed position, extends generally horizontally from the side wall of the cabin toward the center of the cabin. The table top is generally of a honeycomb composite construction and may be of a single leaf design or may have two leaves hinged together (e.g., a proximal leaf adjacent the cabin's side wall and a distal leaf extending toward the center of the cabin). The table top may be of a cantilever design in which a proximal end of the proximal leaf is attached to the cabin's side wall and a proximal end of the distal leaf is attached via hinges to a distal end of the proximal leaf. In some such table tops, each leaf tapers generally from one end to the other to provide greater leg room under the deployed table and to provide a compact design capable of being stowed within the side wall. Because of the cantilever design, greater stresses are exerted on the table top at the proximal end than at the distal end. Thus, of the two leafs, it is probably more important for the proximal leaf to be tapered than for the distal leaf to be tapered. To achieve this taper, each leaf is formed of multiple honeycomb elements with each element having a honeycomb core sandwiched between two generally rigid skins. The honeycomb elements are stacked such that the leaf is multiple honeycomb layers thick. Each leaf further includes upper and lower veneer layers covered with a protective coating, such as a urethane, to give the table top a pleasing appearance.

A disadvantage associated with such table tops is the skill and effort required to manufacture the tapered leaves. Because each leaf has multiple honeycomb elements, many steps are required to manufacture the leaf. Also, although the table tops are generally light weight, the presence of multiple honeycomb elements increases the weight.

SUMMARY OF THE INVENTION

Among the several objects and advantages of the present invention may be noted the provision of an improved table top and table top leaf; the provision of such a table top leaf which is more economical to manufacture than prior art table top leaves without sacrificing strength or durability; the provision of such a table top leaf which may be manufactured more quickly than prior art table top leaves; and the provision of such a table top leaf which is lighter than prior art table to leaves.

Generally, a lightweight aircraft table top member of the present invention has first and second opposite end margins. The table top member comprises first and second skin panels of sheet material, and a honeycomb core. Each skin panel extends longitudinally from the first end margin to the second end margin. The honeycomb core is between the first and second skin panels and bonded thereto. The core extends longitudinally from the first end margin to the second end margin and has a cellular structure with each of a plurality of cells thereof extending from the first skin panel to the second skin panel. Each of the plurality of cells has a first cell end in contact with the first skin panel and a second cell end in contact with the second skin panel. Each of the plurality of cells has a cell length equal to the distance between its first and second cell ends. The cell lengths of some of the plurality of cells is at least 150% as long as those of some others of the plurality of cells.

Another aspect of the present invention is a table top member comprising a honeycomb core, an upper skin panel of sheet material and a lower skin panel of sheet material. The honeycomb core extends longitudinally from the first end margin to the second end margin. The honeycomb core has a first end generally adjacent the first end margin and an opposite second end generally adjacent the second end margin. The honeycomb core has a top surface and a bottom surface. The honeycomb core further has a cellular structure with each of a plurality of cells thereof having a top edge and a bottom edge. Each of the plurality of cells has a cell length equal to the distance between its top and bottom edges. The top edges of the plurality of cells define the core's top surface. The bottom edges of the plurality of cells define the core's bottom surface. The honeycomb core includes first cells, second cells and midway cells. The first cells constitute some cells of the plurality of cells adjacent the core's first end. The second cells constitute some cells of the plurality of cells adjacent the core's second end. The midway cells constitute some cells of the plurality of cells located generally midway between the core's first and second ends. The upper skin panel of sheet material has an upper face and a lower face. The lower face of the upper skin panel is bonded to the core's top surface. The lower skin panel of sheet material has an upper face and a lower face. The upper face of the lower skin panel is bonded to the core's bottom surface. The honeycomb core tapers in thickness from its first end to its second end such that the length of each of the midway cells is less than the length of each of the first cells and such that the length of each of the second cells is less than the length of each of the midway cells.

Another aspect of the present invention comprises a lightweight aircraft table top member having a first end margin adapted to be operatively connected to the aircraft and a second end margin longitudinally spaced from and opposite the first end margin. The table top member comprises a honeycomb core, an upper skin panel of sheet material, and a lower skin panel of sheet material. The honeycomb core extends longitudinally from the first end margin to the second end margin. The honeycomb core has a first end generally adjacent the first end margin and an opposite second end generally adjacent the second end margin. The honeycomb core has a top surface and a bottom surface. The honeycomb core further has a cellular structure with each of a plurality of cells thereof having a top edge and a bottom edge. Each of the plurality of cells has a cell length equal to the distance between its top and bottom edges. The top edges of the plurality of cells define the core's top surface and the bottom edges of the plurality of cells define the core's bottom surface. The upper skin panel of sheet material has an upper face and a lower face. The lower face of the upper skin panel is bonded to the core's top surface. The lower skin panel of sheet material has an upper face and a lower face. The upper face of the lower skin panel is bonded to the core's bottom surface. The upper and lower skin panels each have laterally extending first edges adjacent the core's first end and laterally extending second edges adjacent the core's second end. The first edge of the upper skin panel is spaced from the first edge of the lower skin panel a first distance. The second edge of the upper skin panel is spaced from the second edge of the lower skin panel a second distance. The second distance is less than the first distance.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
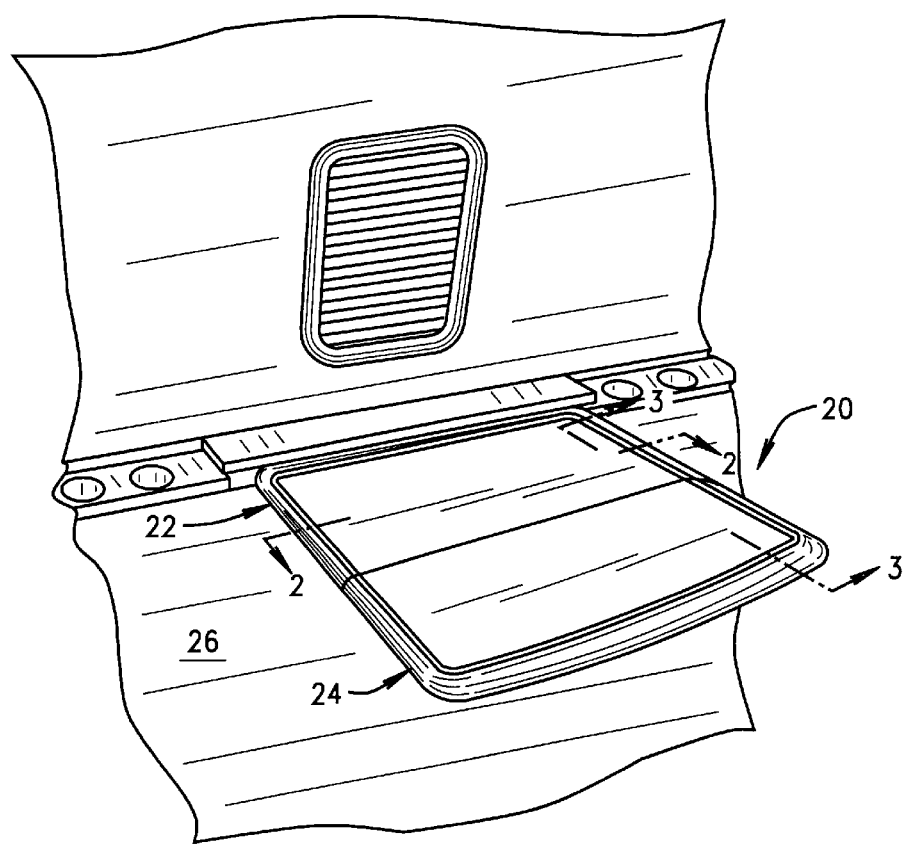
FIG. 1 is perspective view of a lightweight aircraft table top extending from a side wall of an aircraft cabin, the table top having a proximal leaf and a distal leaf.

Referring now to the drawings, and first more particularly to FIG. 1, a lightweight aircraft table top of the present invention is generally indicated by the reference numeral 20. The table top 20 comprises a proximal (first) table top leaf, generally indicated at 22, and a distal (second) table top leaf, generally indicated at 24. As discussed below, the distal table top leaf 24 is connected to the proximal table top leaf 22 via hinges. The proximal table top leaf 22 is attached to a side wall 26 of a cabin of an aircraft, such as a corporate jet, via a support mechanism (not shown). The support mechanism enables the table top 20 to be moved between a stowed position (not shown) and a deployed position (shown in FIG. 1). The table top 20, when in its stowed position, is hid within a compartment in the side wall 26 of the cabin. The table top, when in its deployed position extends generally horizontally from the side wall of the cabin toward the center of the cabin. This specification uses the terms "proximal" and "distal" which are to be distinguished from one another. The term "proximal" means the one closest to the side wall 26 of the cabin and the term "distal" means the one farthest from the side wall of the cabin. These terms are used to assist the reader in an understanding of the embodiment. However, these terms are not to be read into the claims to limit the invention in any way unless these terms are specifically incorporated into the claims.

Figure 2:
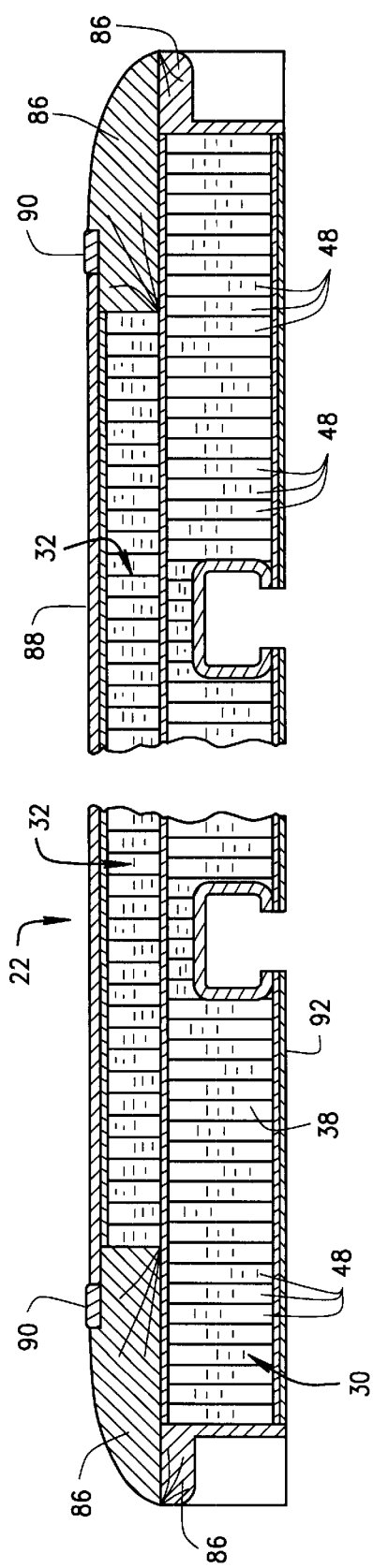
FIG. 2 is an enlarged lateral cross-sectional view of the proximal leaf taken along the plane of line 2—2 of FIG. 1.
Figure 3:
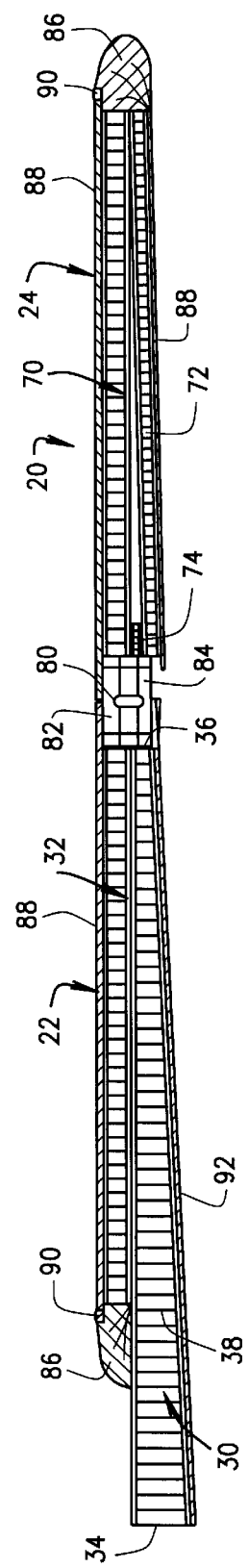
FIG. 3 is a longitudinal cross-sectional view of the table top taken along the plane of line 3—3 of FIG. 1.
Figure 4:
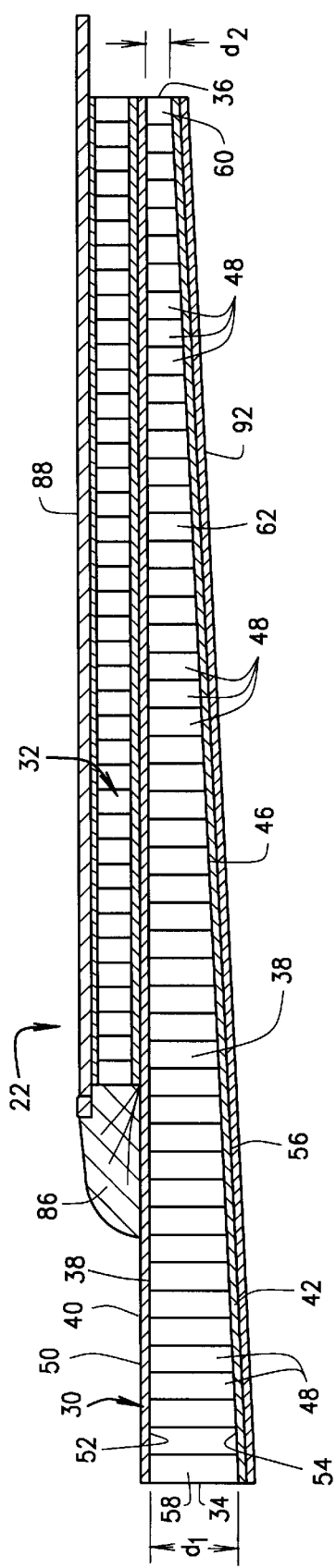
FIG. 4 an enlarged longitudinal cross-sectional view of the proximal leaf of FIG. 1.

Referring now to FIGS. 2–4, the proximal table top leaf 22 comprises a primary honeycomb composite member 30 and a secondary honeycomb composite member 32 secured to a top surface of the primary member. The primary honeycomb composite member 30 has a proximal (first) end margin 34 adapted to be operatively connected to the cabin's side wall 26 and a distal (second) end margin 36 longitudinally spaced from and opposite the proximal end margin. The primary honeycomb composite member 30 comprises a honeycomb core, generally indicated at 38, an upper skin panel of sheet material 40, and a lower skin panel of sheet material 42. Preferably, the honeycomb core 38 is of paper and the upper and lower skin panels 40, 42 are of fiberglass.

The honeycomb core 38 extends longitudinally from the proximal end margin 34 to the distal end margin 36. The honeycomb core 38 has a proximal (first) end generally adjacent the proximal end margin 34 and an opposite distal (second) end generally adjacent the second end margin. The honeycomb core 38 has a top surface 44 and a bottom surface 46. The honeycomb core 38 has many cells 40 and is of a cellular structure with each of a plurality of cells thereof having a top edge and a bottom edge. Most of the cells 48 are open cells 48. However, the cells adjacent the edge are preferably filled with a suitable edge fill. Each of the plurality of cells 48 has a cell length equal to the distance between its top and bottom edges. The top edges of the plurality of cells define the top surface 44 of the core 38 and the bottom edges of the plurality of cells define the bottom surface 46 of the core. The upper skin panel 40 is preferably generally planar and has an upper face 50 and a lower face 52. The lower face 52 of the upper skin panel 40 is bonded to the core's top surface 44. The lower skin panel 42 is preferably generally planar and has an upper face 54 and a lower face 56. The upper face 54 of the lower skin panel 42 is bonded to the core's bottom surface 46.

Referring to FIGS. 3 and 4, the honeycomb core includes proximal (first) cells 58, distal (second) cells 60 and midway cells 62. The proximal cells 58 constitute some cells of the plurality of cells adjacent the core's proximal end. The distal cells 60 constitute some cells of the plurality of cells adjacent the core's distal end. The midway cells 62 constitute some cells of the plurality of cells located generally midway between the core's proximal and distal ends 58, 60. The honeycomb core tapers in thickness from its proximal end to its distal end such that the length of each of the midway cells 62 is less than the length of each of the proximal cells 58 and such that the length of each of the distal cells 60 is less than the length of each of the midway cells.

Preferably, the upper skin panel 40 is bonded to the top edges of the proximal, distal, and midway cells 58, 60, 62, and the lower skin panel 42 is bonded to the lower edges of the proximal, distal, and midway cells. A proximal (first) edge of the upper skin panel 40 is spaced a first distance $d_2$, (FIG. 4) from a proximal (first) edge of the lower skin panel 42. A distal (second) edge of the upper skin panel 40 is spaced a second distance $d_2$ from a distal (second) edge of the lower skin panel 42. Preferably, the second distance $d_2$ is less than the first distance $d_1$. Also preferably, the first distance is equal to the cell length of the proximal cells 58 and the second distance is equal to the cell length of the distal cells 60. Because the upper and lower skin panels 40, 42 are preferably generally planar, they converge toward one another as they extend from the proximal end margin to the distal end margin. Preferably, the second distance is at least 20% as great as the first distance but less than 75% as great as the first distance. In the preferred embodiment, the first distance may be 1.5 inches and the second distance may be 0.5 inches. However, it is to be understood that the first and second distances may vary depending upon the characteristics desired of the table top.

Figure 5:
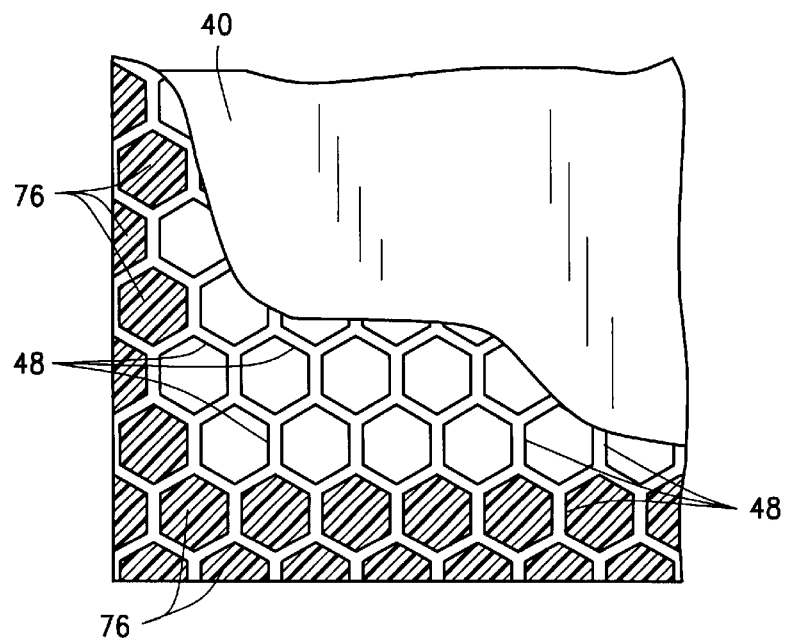
FIG. 5 is an enlarged fragmented top plan view of a honeycomb panel of the proximal leaf with portions removed to show detail.

The secondary honeycomb composite member 32 preferably has an aluminum core with fiberglass skins. The secondary honeycomb composite member 32 is bonded to the upper skin panel 40 of the primary member 30 via a suitable adhesive, such as 3M® 1357 adhesive. The distal table top leaf 24 includes an upper honeycomb composite member 70, a lower honeycomb composite member 72 and a shim 74. The upper honeycomb composite member 70 is similar to the secondary composite member 32. The lower honeycomb composite member 72 is preferably a relatively thin honeycomb composite member having a paper core and fiberglass skins. The shim 74 is positioned between and bonded to the proximal edge margin of the upper composite member 70 and the proximal edge margin of the lower composite member 72. The distal edge margin of the upper composite member 70 is bonded to the distal edge margin of the lower composite member 72. As shown in FIG. 5, the edges of all of the honeycomb composite members are filled with Epocast 87269A and B filler 76 to enable wood trim and fastener members to be attached to the composite members. Preferably, the edges are filled to a thickness of one and one-half cells.

The distal table top leaf 24 is attached to the proximal table top leaf 26 via one or more hinges 80 (FIG. 3). Preferably, a first wood strip 82 is bonded to the distal ends of the primary and secondary honeycomb composite members 30, 32 of the proximal table top leaf 22 and a second wood strip 84 is bonded to the proximal end of the upper honeycomb composite member 70 of the distal leaf 24. The hinges 80 are secured to the wood strips 82, 84. The table top 20 further includes decorative wood trim pieces 86 along the edges of the composite members. Preferably, the upper surface of the secondary honeycomb composite member 32, the upper surface of the upper honeycomb composite member 70 of the distal leaf 24 and the lower surface of the lower honeycomb composite member 70 of the distal leaf are covered with decorative wood veneer panels 88. The table top 20 also preferably includes a decorative gold inlay 90 around one or more of the wood veneer panels 88. The lower surface of the primary honeycomb composite member 30 may be covered by a suitable laminate 92.

Although a particular structure for the distal leaf has been described, it is to be understood that other distal leaf structures may be incorporated without departing from the scope of the present invention. Also, it is envisioned that that the a table top of the present invention could comprise a single leaf. Moreover, although the table top has been described as preferably having certain cosmetic items (e.g., wood trim, veneer, gold inlay, etc.) it is to be understood some or all of these cosmetic items could be eliminated without departing from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An aircraft comprising:
    an aircraft cabin; and
    a lightweight aircraft table top member within the aircraft cabin, the aircraft table top member having first and second opposite end margins, the table top member comprising:
        first and second skin panels of sheet material, each skin panel extending longitudinally from the first end margin to the second end margin; and
        a honeycomb core between the first and second skin panels and bonded thereto, the core extending longitudinally from the first end margin to the second end margin and having a cellular structure with each of a plurality of cells thereof extending from the first skin panel to the second skin panel, each of the plurality of cells having a first cell end in contact with the first skin panel and a second cell end in contact with the second skin panel, each of the plurality of cells having a cell length equal to the distance between its first and second cell ends, the cell lengths of some of the plurality of cells being at least 150% as long as those of some others of the plurality of cells.

2. An aircraft as set forth in claim 1 wherein the first and second skin panels converge toward one another as they extend from the first end margin to the second end margin.

3. An aircraft as set forth in claim 1 wherein the cell lengths of said some of the plurality of cells are at least twice as long as those of said some others of the plurality of cells.

4. An aircraft as set forth in claim 1 wherein the core tapers from the first end margin to the second end margin.

5. An aircraft as set forth in claim 1 wherein the first and second skin panels each have laterally extending first edges adjacent the member's first edge margin and laterally extending second edges adjacent the member's second edge margin, the first edge of the first skin panel being spaced from the first edge of the second skin panel, the second edge of the first skin panel being spaced from the second edge of the second skin panel.

6. An aircraft as set forth in claim 5 wherein the first edge of the first skin panel is spaced from the first edge of the second skin panel a first distance and wherein the second edge of the first skin panel is spaced from the second edge of the second skin panel a second distance, the second distance being less than the first distance.

7. An aircraft comprising:
    an aircraft cabin having a wall; and
    a lightweight aircraft table top member within the aircraft cabin, the aircraft table top member having a first end margin operatively connected to the wall of the aircraft cabin and a second end margin longitudinally spaced from and opposite the first end margin, the table top member comprising:
        honeycomb core extending longitudinally from the first end margin to the second end margin, the honeycomb core having a first end generally adjacent the first end margin and an opposite second end generally adjacent the second end margin, the honeycomb core having a top surface and a bottom surface, the honeycomb core further having a cellular structure with each of a plurality of cells thereof having a top edge and a bottom edge, each of the plurality of cells having a cell length equal to the distance between its top and bottom edges, the top edges of the plurality of cells defining the core's top surface and the bottom edges of the plurality of cells defining the core's bottom surface, the honeycomb core including first cells, second cells and midway cells, the first cells constituting some cells of the plurality of cells adjacent the core's first end, the second cells constituting some cells of the plurality of cells adjacent the core's second end, the midway cells constituting some cells of the plurality of cells located generally midway between the core's first and second ends;
        an upper skin panel of sheet material having an upper face and a lower face, the lower face of the upper skin panel being bonded to the core's top surface; and
        a lower skin panel of sheet material having an upper face and a lower face, the upper face of the lower skin panel being bonded to the core's bottom surface;
        the honeycomb core tapering in thickness from its first end to its second end such that the length of each of the midway cells is less than the length of each of the first cells and such that the length of each of the second cells is less than the length of each of the midway cells.

8. An aircraft as set forth in claim 7 wherein the table top member constitutes a first table top leaf, the aircraft further comprising a second table top leaf and at least one hinge, the first end margin of the second table top leaf being hinged to the second end margin of the first table top leaf via the at least one hinge.

9. An aircraft as set forth in claim 7 further comprising a first table top leaf, a second table top leaf, and at least one hinge, the table top member constituting one of the table top leaves, the first and second table top leaves being hinged to one another via the at least one hinge.

10. An aircraft as set forth in claim 7 wherein:
the upper skin panel is bonded to the top edges of the first, second and midway cells; and
the lower skin panel is bonded to the lower edges of the first, second and midway cells.

11. An aircraft as set forth in claim 7 wherein the upper skin panel is generally planar.

12. An aircraft as set forth in claim 11 wherein the lower skin panel is generally planar.

13. An aircraft as set forth in claim 7 wherein the upper and lower skin panels each have laterally extending first edges adjacent the core's first end and laterally extending second edges adjacent the core's second end, the first edge of the upper skin panel being spaced from the first edge of the lower skin panel, the second edge of the upper skin panel being spaced from the second edge of the lower skin panel.

14. An aircraft as set forth in claim 13 wherein the first edge of the upper skin panel is spaced from the first edge of the lower skin panel a first distance and wherein the second edge of the upper skin panel is spaced from the second edge of the lower skin panel a second distance, the second distance being less than the first distance.

15. An aircraft comprising:
an aircraft cabin having a wall; and
a lightweight aircraft table top member having a first end margin operatively connected to the wall of the aircraft cabin and a second end margin longitudinally spaced from and opposite the first end margin, the table top member comprising:
  a honeycomb core extending longitudinally from the first end margin to the second end margin, the honeycomb core having a first end generally adjacent the first end margin and an opposite second end generally adjacent the second end margin, the honeycomb core having a top surface and a bottom surface, the honeycomb core further having a cellular structure with each of a plurality of cells thereof having a top edge and a bottom edge, each of the plurality of cells having a cell length equal to the distance between its top and bottom edges, the top edges of the plurality of cells defining the core's top surface and the bottom edges of the plurality of cells defining the core's bottom surface;
  an upper skin panel of sheet material having an upper face and a lower face, the lower face of the upper skin panel being bonded to the core's top surface; and
  a lower skin panel of sheet material having an upper face and a lower face, the upper face of the lower skin panel being bonded to the core's bottom surface;
  the upper and lower skin panels each having laterally extending first edges adjacent the core's first end and laterally extending second edges adjacent the core's second end, the first edge of the upper skin panel being spaced from the first edge of the lower skin panel a first distance, the second edge of the upper skin panel being spaced from the second edge of the lower skin panel a second distance, the second distance being less than the first distance.

16. An aircraft as set forth in claim 15 wherein the honeycomb core includes first cells and second cells, the first cells constituting some cells of the plurality cells generally adjacent the core's first end, the second cells constituting some cells of the plurality of cells generally adjacent the core's second end, each of the first cells having a cell length equal to the first distance.

17. An aircraft as set forth in claim 16 wherein each of the second cells has a cell length equal to the second distance.

18. An aircraft as set forth in claim 17 wherein the honeycomb core further includes midway cells, the midway cells constituting some cells of the plurality of cells located generally midway between the core's first and second ends, the length of each of the midway cells being less than the length of each of the first cells and being greater than each of the second cells.

19. An aircraft as set forth in claim 17 wherein the honeycomb core tapers in thickness from its first end to its second end.

20. An aircraft as set forth in claim 17 wherein the second distance is at least 20% as great as the first distance.

21. An aircraft as set forth in claim 17 wherein the first distance is at least 150% as great as the second distance.

22. A lightweight aircraft table top comprising a first table top leaf, a second table top leaf, and at least one hinge, the first table top leaf comprising a lightweight aircraft table top member having a first end margin adapted to be operatively connected to an aircraft and a second end margin longitudinally spaced from and opposite the first end margin, the first end margin of the second table top leaf being hinged to the second end margin of the first table top leaf via the at least one hinge, the table top member comprising:
  a honeycomb core extending longitudinally from the first end margin to the second end margin, the honeycomb core having a first end generally adjacent the first end margin and an opposite second end generally adjacent the second end margin, the honeycomb core having a top surface and a bottom surface, the honeycomb core further having a cellular structure with each of a plurality of cells thereof having a top edge and a bottom edge, each of the plurality of cells having a cell length equal to the distance between its top and bottom edges, the top edges of the plurality of cells defining the core's top surface and the bottom edges of the plurality of cells defining the core's bottom surface, the honeycomb core including first cells, second cells and midway cells, the first cells constituting some cells of the plurality of cells adjacent the core's first end, the second cells constituting some cells of the plurality of cells adjacent the core's second end, the midway cells constituting some cells of the plurality of cells located generally midway between the core's first and second ends;
  an upper skin panel of sheet material having an upper face and a lower face, the lower face of the upper skin panel being bonded to the core's top surface; and
  a lower skin panel of sheet material having an upper face and a lower face, the upper face of the lower skin panel being bonded to the core's bottom surface;
  the honeycomb core tapering in thickness from its first end to its second end such that the length of each of the midway cells is less than the length of each of the first cells and such that the length of each of the second cells is less than the length of each of the midway cells.

23. A lightweight aircraft table top comprising; a first table top leaf, a second table top leaf, and at least one hinge, the first and second table top leaves being hinged to one another via the at least one hinge, one of the table top leaves comprising a lightweight aircraft table top member having a first end margin adapted to be operatively connected to an aircraft and a second end margin longitudinally spaced from and opposite the first end margin, the table top member comprising:

a honeycomb core extending longitudinally from the first end margin to the second end margin, the honeycomb core having a first end generally adjacent the first end margin and an opposite second end generally adjacent the second end margin, the honeycomb core having a top surface and a bottom surface, the honeycomb core further having a cellular structure with each of a plurality of cells thereof having a top edge and a bottom edge, each of the plurality of cells having a cell length equal to the distance between its top and bottom edges, the top edges of the plurality of cells defining the core's top surface and the bottom edges of the plurality of cells defining the core's bottom surface, the honeycomb core including first cells, second cells and midway cells, the first cells constituting some cells of the plurality of cells adjacent the core's first end, the second cells constituting some cells of the plurality of cells adjacent the core's second end, the midway cells constituting some cells of the plurality of cells located generally midway between the core's first and second ends;

an upper skin panel of sheet material having an upper face and a lower face, the lower face of the upper skin panel being bonded to the core's top surface; and a lower skin panel of sheet material having an upper face and a lower face, the upper face of the lower skin panel being bonded to the core's bottom surface;

the honeycomb core tapering in thickness from its first end to its second end such that the length of each of the midway cells is less than the length of each of the first cells and such that the length of each of the second cells is less than the length of each of the midway cells.

24. A lightweight aircraft table top member having first and second opposite end margins, the table top member comprising:

first and second skin panels of sheet material, each skin panel extending longitudinally from the first end margin to the second end margin;

a honeycomb core between the first and second skin panels and bonded thereto, the core extending longitudinally from the first end margin to the second end margin and having a cellular structure with each of a plurality of cells thereof extending from the first skin panel to the second skin panel, each of the plurality of cells having a first cell end in contact with the first skin panel and a second cell end in contact with the second skin panel, each of the plurality of cells having a cell length equal to the distance between its first and second cell ends, the cell lengths of some of the plurality of cells being at least 150% as long as those of some others of the plurality of cells; and a decorative wood veneer panel over the first skin panel such that the first skin panel is between the decorative wood veneer panel and the honeycomb core.

25. A lightweight aircraft table top member as set forth in claim 24 further comprising a laminate on the second skin panel, the laminate being secured to the second skin panel such that the second skin panel is between the laminate and the honeycomb core.

* * * * *